US012123308B2

(12) United States Patent
Zheng et al.

(10) Patent No.: US 12,123,308 B2
(45) Date of Patent: Oct. 22, 2024

(54) CLEARANCE CONTROL SYSTEM FOR A GAS TURBINE ENGINE

(71) Applicant: General Electric Company, Schenectady, NY (US)

(72) Inventors: Li Zheng, Latham, NY (US); Nicholas Joseph Kray, Mason, OH (US); Changjie Sun, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/702,101

(22) Filed: Mar. 23, 2022

(65) Prior Publication Data

US 2023/0304415 A1 Sep. 28, 2023

(51) Int. Cl.
*F01D 11/22* (2006.01)
*F01D 11/12* (2006.01)

(52) U.S. Cl.
CPC ............ *F01D 11/22* (2013.01); *F01D 11/122* (2013.01); *F05D 2240/11* (2013.01); *F05D 2260/232* (2013.01); *F05D 2260/606* (2013.01); *F05D 2300/505* (2013.01)

(58) Field of Classification Search
CPC ........ F01D 11/22; F01D 11/20; F01D 11/122; F01D 11/24
See application file for complete search history.

(56) References Cited

U.S. PATENT DOCUMENTS 5,545,007 A 8/1996 Martin
6,142,477 A 11/2000 Meinzer
6,547,522 B2 4/2003 Turnquist et al.
7,079,957 B2 * 7/2006 Finnigan ................ F01D 11/22 702/33
7,125,223 B2 10/2006 Turnquist et al.
7,367,776 B2 5/2008 Albers et al.
7,448,849 B1 11/2008 Webster et al.
7,686,569 B2 3/2010 Paprotna et al.
7,874,793 B2 1/2011 Razzell et al.
8,714,918 B2 5/2014 Tibbott et al.
8,894,358 B2 11/2014 Bacic
8,961,115 B2 2/2015 Rhoden et al.
9,169,741 B2 10/2015 Szwedowicz et al.
9,845,700 B2 12/2017 Dierksmeier
10,082,038 B2 9/2018 Cortenquisse et al.
10,690,147 B2 6/2020 Hiernaux
10,738,791 B2 * 8/2020 Moniz .................. F04D 29/321

(Continued)

FOREIGN PATENT DOCUMENTS

CN 108019242 A 5/2018
WO WO2015102953 A1 7/2015

OTHER PUBLICATIONS

U.S. Appl. No. 17/112,320 filed Dec. 4, 2020.

*Primary Examiner* — Courtney D Heinle
*Assistant Examiner* — Ryan C Clark
(74) *Attorney, Agent, or Firm* — Dority & Manning, P.A.

(57) ABSTRACT

A gas turbine engine is provided. The gas turbine engine includes: a turbomachine; a fan including a plurality of fan blades rotatably driven by the turbomachine; a nacelle surrounding at least in part the plurality of fan blades of the fan; and a clearance control system including a control ring positioned at least partially within the nacelle, coupled to the nacelle, or both for control of a clearance gap between the plurality of fan blades and the nacelle.

20 Claims, 6 Drawing Sheets

(56) References Cited

U.S. PATENT DOCUMENTS

| | | | | |
|---|---|---|---|---|
| 11,060,412 | B2 | 7/2021 | Gamm et al. | |
| 2007/0043497 | A1* | 2/2007 | Leogrande | G01S 13/88 701/100 |
| 2013/0034424 | A1* | 2/2013 | Webster | F01D 11/20 415/173.2 |
| 2013/0170966 | A1 | 7/2013 | Cook | |
| 2014/0212276 | A1* | 7/2014 | Harris | F01D 11/24 415/151 |
| 2017/0363094 | A1* | 12/2017 | Kumar | F01D 11/24 |
| 2018/0328215 | A1 | 11/2018 | Jalbert et al. | |
| 2019/0128135 | A1 | 5/2019 | Skertic | |
| 2020/0095883 | A1* | 3/2020 | Kray | F01D 11/24 |

* cited by examiner

CLEARANCE CONTROL SYSTEM FOR A GAS TURBINE ENGINE

FIELD

The present disclosure relates to a clearance control system for a gas turbine engine, and more specifically to a clearance control system for a fan of a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan having a plurality of fan blades and an outer nacelle may be provided to surround the plurality of fan blades.

In order to provide a desired propulsive benefit for the gas turbine engine, the inventors of the present disclosure have found that maintaining a relatively narrow clearance between the fan blades and the outer nacelle may be beneficial. Accordingly, improvements to maintain a relatively narrow clearance between the fan blades and the outer nacelle would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
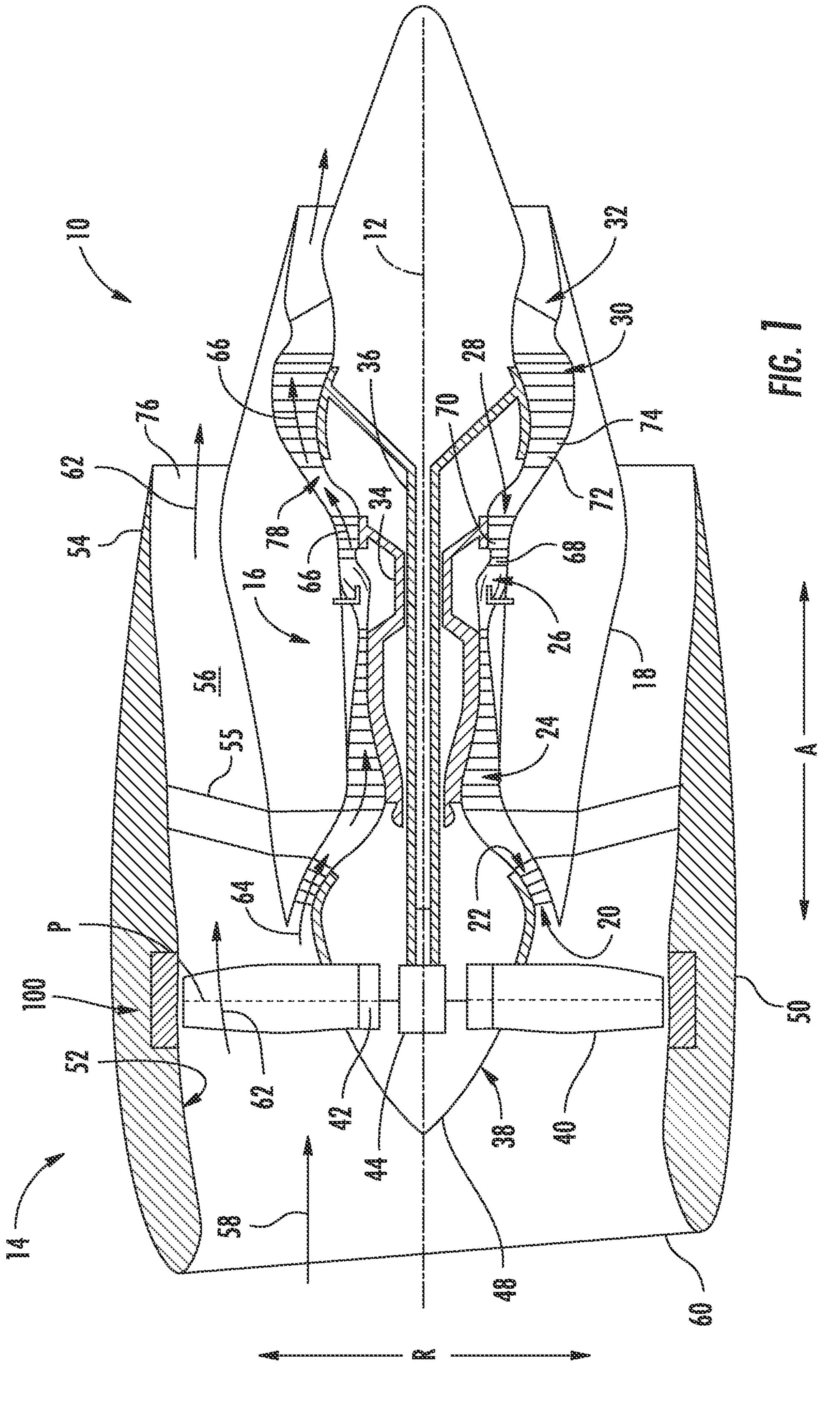
FIG. 1 is a schematic cross-sectional view of an exemplary gas turbine engine according to various embodiments of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "coupled," "fixed," "attached thereto," and the like refer to both direct coupling, fixing, or attaching, as well as indirect coupling, fixing, or attaching through one or more intermediate components or features, unless otherwise specified herein.

As used herein, the terms "first" and "second" may be used interchangeably to distinguish one component from another and are not intended to signify location or importance of the individual components.

The term "composite", as used herein, refers to a material produced from two or more constituent materials, wherein at least one of the constituent materials is a non-metallic material. Example composite materials include polymer matrix composites (PMC), ceramic matrix composites (CMC), etc.

The present disclosure is generally related to a gas turbine engine having a turbomachine, a fan having a plurality of fan blades rotatably driven by the turbomachine, and a nacelle surrounding at least in part the plurality of fan blades of the fan. The gas turbine engine further includes a clearance control system having a control ring coupled to or positioned at least partially within the nacelle for control of a clearance between the plurality of fan blades and the nacelle. The control ring may be formed of a metal material having similar thermal expansion properties as a metal material forming the fan blades. By contrast, the nacelle may be formed of a composite material having different thermal expansion properties. In such a manner, inclusion of the clearance control system may allow for the gas turbine engine to maintain a desired clearance between the fan blades and the outer nacelle to maintain an efficiency of the fan of the gas turbine engine.

Further, in certain exemplary embodiments, an activation assembly may be included with the clearance control system for providing a flow of bleed air from the turbomachine to the control ring. Such may allow the control ring to further expand and contract relative to the nacelle to control the clearance between the fan blades and the outer nacelle.

Other embodiments are also contemplated, as discussed below.

Referring now to the drawings, wherein identical numerals indicate the same or similar elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; see, e.g., FIG. 4). In general, the turbofan engine 10 includes a fan section 14 (also referred to as a fan) and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP turbine 30 may also be referred to as a "drive turbine".

For the embodiment depicted, the fan section 14 includes a variable pitch fan 38 having a plurality of fan blades 40 coupled to a disk 42 in a spaced apart manner. More specifically, for the embodiment depicted, the fan section 14 includes a single stage fan 38, housing a single stage of fan blades 40. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan 38 is mechanically coupled to and rotatable with the LP turbine 30, or drive turbine. More specifically, the fan blades 40, disk 42, and actuation member 44 are together rotatable about the longitudinal centerline 12 by LP shaft 36 in a "direct drive" configuration. Accordingly, the fan 38 is coupled with the LP turbine 30 in a manner such that the fan 38 is rotatable by the LP turbine 30 at the same rotational speed as the LP turbine 30.

Further, it will be appreciated that the fan 38 defines a fan pressure ratio and the plurality of fan blades 40 define a blade passing frequency. As used herein, the "fan pressure ratio" refers to a ratio of a pressure immediately downstream of the plurality of fan blades 40 during operation of the fan 38 to a pressure immediately upstream of the plurality of fan blades 40 during the operation of the fan 38. Also as used herein, the "blade passing frequency" defined by the plurality of fan blades 40 refers to a frequency at which a fan blade 40 passes a fixed location along the circumferential direction C of the gas turbine engine 10. The blade passing frequency may generally be calculated by multiplying a rotational speed of the fan 38 (in revolutions per minute) by the number of fan blades 40 and dividing by 60 (60 seconds per 1 minute).

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the plurality of fan blades 40 of the fan 38 and/or at least a portion of the turbomachine 16. The outer nacelle 50 may also be referred to as a composite fan containment case. More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust.

Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 and described above is by way of example only, and that in other exemplary embodiments, the turbofan engine 10 may have any other suitable configuration. For example, in other exemplary embodiments, the turbomachine 16 may include any other suitable number of compressors, turbines, and/or shaft or spools. Additionally, the turbofan engine 10 may not include each of the features described herein, or alternatively, may include one or more features not described herein. For example, in other exemplary embodiments, the fan 38 may not be a variable pitch fan. Additionally, although described as a "turbofan" gas turbine engine, in other embodiments the gas turbine engine may instead be configured as any other suitable ducted gas turbine engine.

Figure 2:
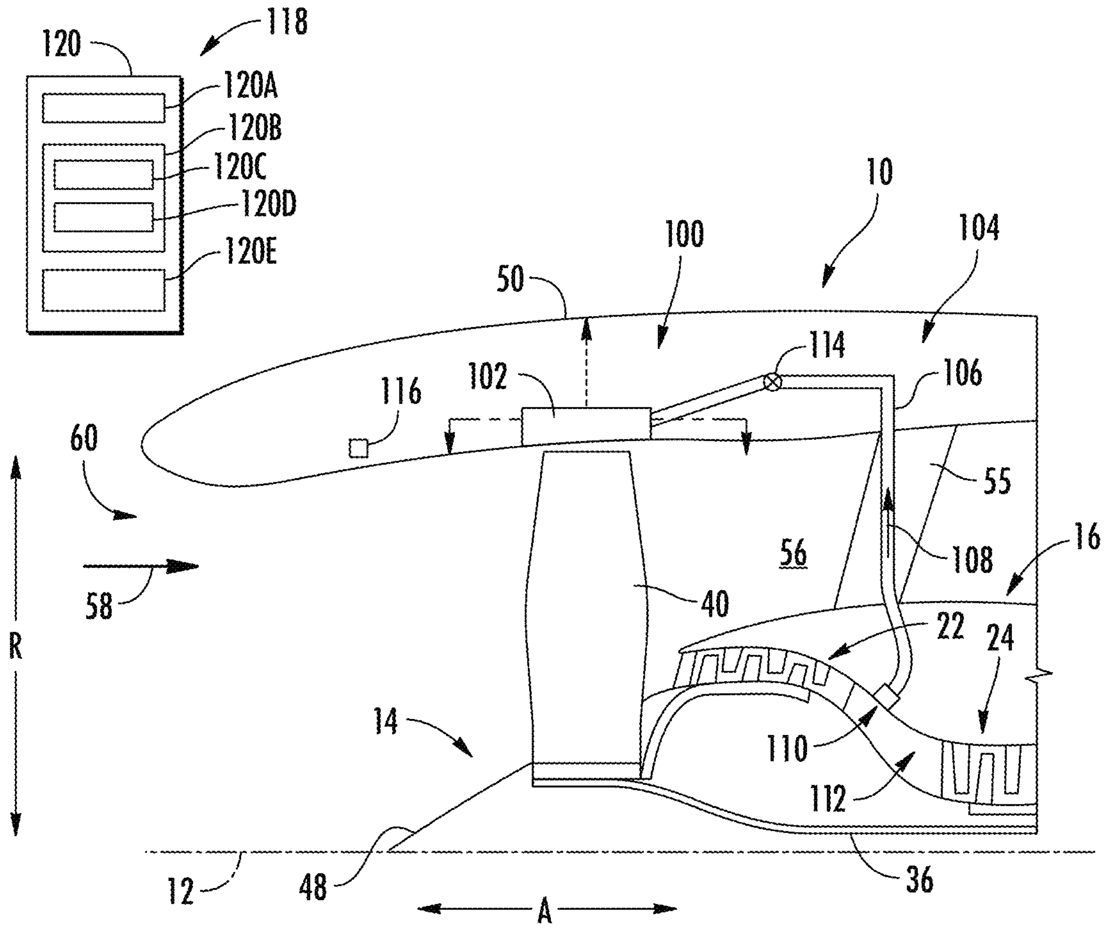
FIG. 2 is a close-up, cross-sectional view of a fan section and a forward end of a turbomachine of the exemplary gas turbine engine of FIG. 1.

Referring now also to FIG. 2, a close-up, cross-sectional view of the fan section 14 and a forward end of the turbomachine 16 of the exemplary turbofan engine 10 of FIG. 1 is provided.

As will be appreciated, for the exemplary embodiment depicted, the turbofan engine 10 further includes a clearance control system 100 in order to maintain a desired clearance between tips of the plurality of fan blades 40 and the outer nacelle 50. In particular, it will be appreciated that for the exemplary embodiment of FIGS. 1 and 2, the plurality of fan blades 40 may be formed of a metal material. By contrast, the outer nacelle 50 may be formed substantially of a composite material. As used herein, the term "formed of a material" (such as "formed of a metal material") refers to the component being either completely formed of a particular material, or having the sub-components that dictate an amount of thermal expansion and contraction of the component formed of the particular material such that a coefficient of thermal expansion of that particular material drives an amount of thermal growth or contraction of the component as a whole.

More specifically, in the embodiment depicted, a structural portion, an outer shell 122 (see FIG. 3), or both of the outer nacelle 50 may be formed of a composite material. In such a manner, it will be appreciated that the outer nacelle 50 may be configured to thermally expand or contract in a different manner than the plurality of fan blades 40. Accordingly, in order to maintain a desired clearance between the radially outer tips of the plurality of fan blades 40 and the outer nacelle 50, the clearance control system 100 is provided.

For the embodiment depicted, the clearance control system 100 includes a control ring 102 positioned at least partially within the outer nacelle 50, coupled to the outer nacelle 50, or both, for control of the clearance between the plurality of fan blades 40 and the outer nacelle 50. In particular, for the embodiment depicted the clearance control system 100 includes the control ring 102 and an activation assembly 104 operable with the control ring 102 to cause a radial movement of one or more aspects of the control ring 102. The activation assembly 104 is in communication with the turbomachine 16, the bypass airflow passage 56, or both. In such a manner, it will be appreciated that the clearance control system 100 may be referred to as an active clearance control system.

Referring particularly to the embodiment of FIG. 2, the activation assembly 104 is in airflow communication with a high-pressure airflow source of the turbofan engine 10 and the control ring 102 for providing an airflow from the high pressure airflow source to the control ring 102. More specifically, for the embodiment depicted, the activation assembly 104 includes an airflow duct 106 extending between the turbomachine 16 and the control ring 102 for receiving a bleed airflow 108 from the turbomachine 16. In such manner, the clearance control system 100 may be in fluid communication with the turbomachine 16.

Briefly, as is depicted in phantom in the embodiment of FIG. 2, it will be appreciated that the bleed airflow 108 provided to the clearance control system 100, and more specifically to the control ring 102 of the clearance control system 100, by the activation assembly 104 may be subsequently transported to any suitable location, such as to a location upstream of the plurality of fan blades 40, to a location downstream of the plurality of fan blades 40 (e.g., the bypass airflow passage 56), to an overboard location (outward of the outer nacelle 50), etc.

Specifically for the embodiment of FIG. 2, the airflow duct 106 defines an inlet 110 in airflow communication with the compressor section of the turbofan engine 10, and more specifically, is in airflow communication with a working gas flow path 112 of the turbomachine 16 at a location downstream of the LP compressor 22 and upstream of the HP compressor 24.

It will be appreciated, however, that in other example embodiments, the clearance control system 100 may be in airflow communication with the turbomachine 16 at any other suitable location. For example, in other exemplary embodiments, the airflow duct 106 may be in airflow communication with the HP compressor 24 for receiving a bleed airflow from the HP compressor 24. Additionally, or alternatively, the airflow duct 106 may be in airflow communication with the turbine section of the turbomachine 16, the jet exhaust nozzle section 32 (see FIG. 1) of the turbomachine 16, or both. Additionally, or alternatively, still, the airflow duct 106 may be in airflow communication with the bypass airflow passage 56 for receiving an airflow from the bypass airflow passage 56. In such a case, the clearance control system 100, or rather the activation assembly 104 of the clearance control system 100, may include one or more of a pump for increasing the pressure of the airflow, a heater or heat exchanger for increasing a temperature of the airflow, or both.

Referring still to FIG. 2, it will be appreciated that the activation assembly 104 further includes a valve 114 in airflow communication with the airflow duct 106 at a location downstream of the control ring 102. The valve 114 may be configured to modulate the airflow through the airflow duct 106 to the control ring 102 (i.e., the bleed airflow 108 in the embodiment shown). In such manner, the valve 114 may control an amount of airflow and heat from such airflow to the control ring 102.

Notably, for the embodiment depicted, it will be appreciated that the turbofan engine 10 further includes a sensor 116. The sensor 116 may be configured to receive data indicative of a rotational speed of the fan 38, a temperature of an airflow through the inlet 60 to the fan 38, or both. In other exemplary aspects, the sensor 116 may be configured to sense any other suitable data indicative of a temperature of the plurality of fan blades 40 of the fan 38, a clearance between the plurality of fan blades 40 and the outer nacelle 50, or both.

Moreover, for the exemplary aspect of the turbofan engine 10 depicted, the turbofan engine 10, the clearance control system 100, or both further includes a controller 118. The controller 118 may be in operable communication with the valve 114 for controlling operation of the valve 114. Further, the controller 118 may be in operable communication with one or more data sources for receiving data indicative of the operating condition of the turbofan engine 10. For example, referring still to FIG. 2, it will be appreciated that the turbofan engine 10 includes the sensor 116 and the controller 118 may be in operable communication with the sensor 116. In such a manner, the controller 118 may be configured to control operation of the valve 114 in response to data received from the sensor 116—e.g., in response to data indicative of the clearance between the plurality of fan blades 40 and the outer nacelle 50.

In one or more exemplary embodiments, the controller 118 depicted in FIG. 2 may be a stand-alone controller 118 for the clearance control system 100, or alternatively, may be integrated into one or more of a controller for the turbofan engine 10 with which the clearance control system 100 is integrated, a controller for an aircraft including the turbofan engine 10 with which the clearance control system 100 is integrated, etc.

Referring particularly to the operation of the controller 118, in at least certain embodiments, the controller 118 can include one or more computing device(s) 120. The computing device(s) 120 can include one or more processor(s) 120A and one or more memory device(s) 120B. The one or more processor(s) 120A can include any suitable processing device, such as a microprocessor, microcontroller, integrated circuit, logic device, and/or other suitable processing device. The one or more memory device(s) 120B can include one or more computer-readable media, including, but not limited to, non-transitory computer-readable media, RAM, ROM, hard drives, flash drives, and/or other memory devices.

The one or more memory device(s) 120B can store information accessible by the one or more processor(s) 120A, including computer-readable instructions 120C that can be executed by the one or more processor(s) 120A. The instructions 120C can be any set of instructions that when executed by the one or more processor(s) 120A, cause the one or more processor(s) 120A to perform operations. In some embodiments, the instructions 120C can be executed by the one or more processor(s) 120A to cause the one or more processor(s) 120A to perform operations, such as any of the operations and functions for which the controller 118 and/or the computing device(s) 120 are configured, the operations for operating a clearance control system 100, as described herein, and/or any other operations or functions of the one or more computing device(s) 120. The instructions 120C can be software written in any suitable programming language or can be implemented in hardware. Additionally, and/or alternatively, the instructions 120C can be executed in logically and/or virtually separate threads on the one or more processor(s) 120A. The one or more memory device(s) 120B can further store data 120D that can be accessed by the one or more processor(s) 120A. For example, the data 120D can include data indicative of power flows, data indicative of engine/aircraft operating conditions, and/or any other data and/or information described herein.

The computing device(s) 120 can also include a network interface 120E used to communicate, for example, with the other components of the compressed clearance control system 100, the turbofan engine 10 incorporating the clearance control system 100, the aircraft incorporating the turbofan engine 10, etc. For example, in the embodiment depicted, the turbofan engine 10 and/or clearance control system 100 may include one or more sensors for sensing data indicative of one or more parameters of the turbofan engine 10, the clearance control system 100, or both. The controller 118 of the clearance control system 100 may be operably coupled to the one or more sensors through, e.g., the network interface, such that the controller 118 may receive data indicative of various operating parameters sensed by the one or more sensors during operation. Further, for the embodiment shown the controller 118 is operably coupled to, e.g., the valve 114. In such a manner, the controller 118 may be configured to actuate the valve 114 in response to, e.g., the data sensed by the one or more sensors (e.g., sensor 116).

The network interface 120E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
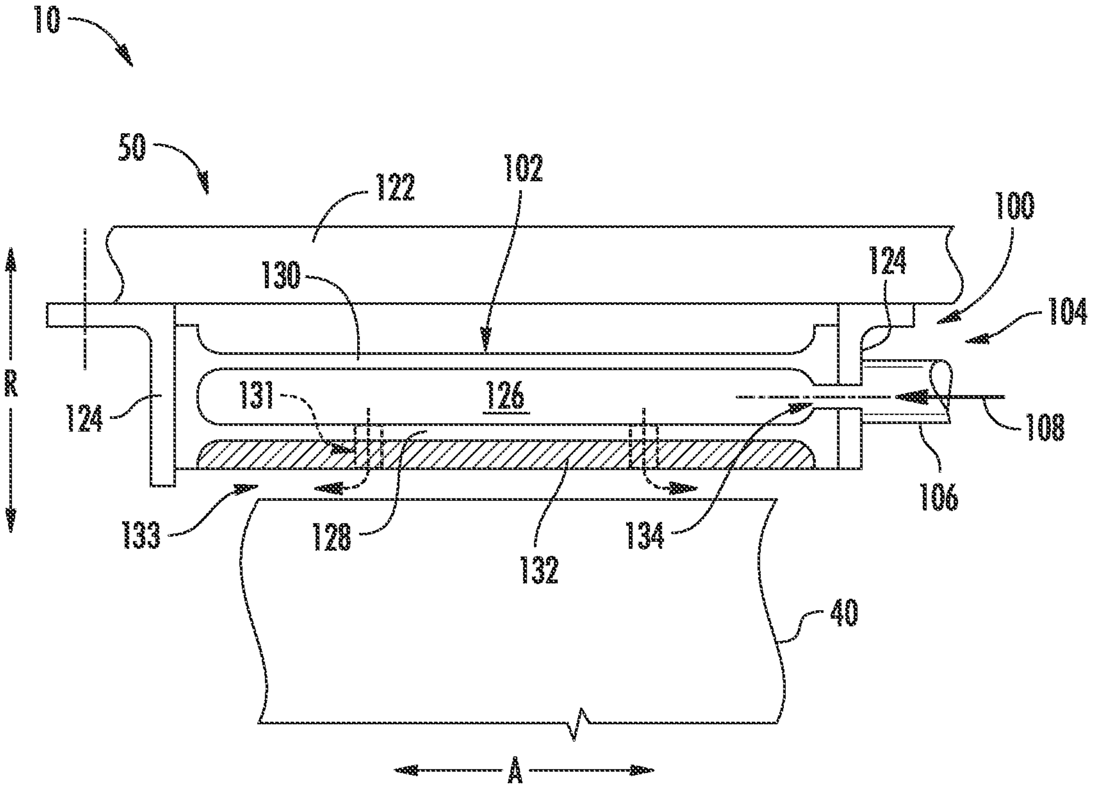
FIG. 3 is a close-up, cross-sectional view of an outer nacelle and a fan blade of the exemplary gas turbine engine of FIG. 1.

Referring now to FIG. 3, a close-up, schematic view is provided of a portion of the outer nacelle 50 and fan of FIG. 2. More specifically, FIG. 3 provides a close-up, cross-sectional, schematic view of the control ring 102 of the clearance control system 100 FIG. 2.

As briefly noted above, the control ring 102 of the clearance control system 100 is positioned at least partially within the outer nacelle 50, coupled to the outer nacelle 50, or both. More specifically, for the embodiment depicted, the outer nacelle 50 includes a shell 122, and the control ring 102 is mounted to the shell 122. Notably, for the embodiment depicted, the control ring 102 is slidably mounted to the shell 122 of the outer nacelle 50, such that the control ring 102 may move along the radial direction R relative to the shell 122. In particular, for the embodiment depicted, the control ring 102 is positioned between a pair of radial mounting brackets 124, and is movable along the radial direction R relative to the radial mounting brackets 124. Such may allow for the control ring 102 to expand and contract relative to the shell 122 during operation of the turbofan engine 10 and clearance control system 100. For example, in the embodiment depicted, the shell 122 is formed of a composite material and the control ring 102 is formed of a metal material. In certain embodiments, the metal material may be the same metal material from which the fan blades 40 are formed. Alternately, however, the metal material forming the control ring 102 may be a different metal material than the plurality of fan blades 40.

As noted above, the control ring 102 is in thermal communication with the airflow from the turbomachine 16 (see FIGS. 1 and 2), the bypass airflow passage 56 (see FIGS. 1 and 2), a location outside of the turbofan engine 10 (e.g., an ambient/freestream air), or a combination thereof. More specifically, for the embodiment depicted, the control ring 102 is in thermal communication with the bleed airflow 108 from the turbomachine 16 provided from the activation assembly 104, or rather, from the airflow duct 106 of the activation assembly 104. More specifically, still, for the embodiment depicted the control ring 102 defines a cavity 126 in airflow communication with the airflow duct 106 of the activation assembly 104 for receiving the bleed airflow 108 from the airflow duct 106 of the activation assembly 104. In such a manner, the control ring 102 may receive, e.g., relatively high temperature airflow (relative to the airflow 58 across the fan blades 40; see FIGS. 1 and 2) to encourage the control ring 102 to increase in temperature and therefore diameter to accommodate a thermal expansion in the radial direction R of fan blades 40 relative to the outer nacelle 50. In such a manner, the outer nacelle 50 may be designed to have a smaller clearance with the fan blades as a baseline, as the control ring 102 may accommodate the desired thermal expansion relative to the fan blades 40 (which the composite material forming the outer nacelle may not).

Notably, for the embodiment depicted, the control ring 102 includes at least two layers, more specifically, includes two layers. The two layers, an inner structure 128 and an outer structure 130, together define one or more airflow gaps therebetween for receiving the bleed airflow 108, and more specifically together define the cavity 126 for receiving the bleed airflow 108. In addition to these two layers, which are formed of a metal material, the clearance control system 100 further includes an abradable layer 132 coupled to the control ring 102 and positioned between the control ring 102 and the plurality of fan blades 40. The abradable layer 132 may allow for relative movement between the fan blade 40 and the outer nacelle 50 in the radial direction R during, e.g., various maneuvers of an aircraft including the turbofan engine 10. Notably, for the embodiment of FIG. 3, the inner structure 128 and abradable layer 132 together define a plurality of through holes 131 extending from the cavity 126, through the inner structure 128 and abradable layer 132, to the clearance gap 133. In such a manner, the clearance control system 100 may provide a pressurized airflow from the cavity 126 to prevent or reduce a flow of air over respective tips of the plurality of fan blades 40.

In the embodiment depicted, the outer structure 130 is positioned inward of the outer shell 122 of the outer nacelle 50 along the radial direction R, slidably coupled to the outer shell 122 through the outer nacelle 50 radial mounting brackets 124. The inner structure 128 faces the plurality of fan blades 40 and is capable of radial movement relative to the outer nacelle 50 (i.e., movement at least partially along the radial direction R). It will be appreciated, that as used herein, the term "faces," with respect to a particular component or set of components (e.g., fan blades 40), refers to being positioned over the component or set of components. The term "faces" does not exclude one or more intermediate layers (e.g., the abradable layer 132).

Further, it will be appreciated that the control ring 102 defines a clearance gap 133 with the plurality of fan blades 40. Through the radial movement of the inner structure 128, as is described herein, the control ring 102 and clearance control system 100 may maintain the clearance gap 133 at a desired size. More specifically, it will be appreciated that the activation assembly 104 is operable with the control ring 102 to cause the radial movement of the inner structure 128 to control the clearance gap 133. More specifically, still, for the embodiment depicted the airflow duct 106 of the activation assembly 104 is operable, when the clearance control system 100 is installed in the turbofan engine 10 (as shown), to feed air (airflow 108) from the turbomachine 16 (see FIG. 2) to the control ring 102 to cause the radial movement of the inner structure 128 to control the clearance gap 133.

Figure 4:
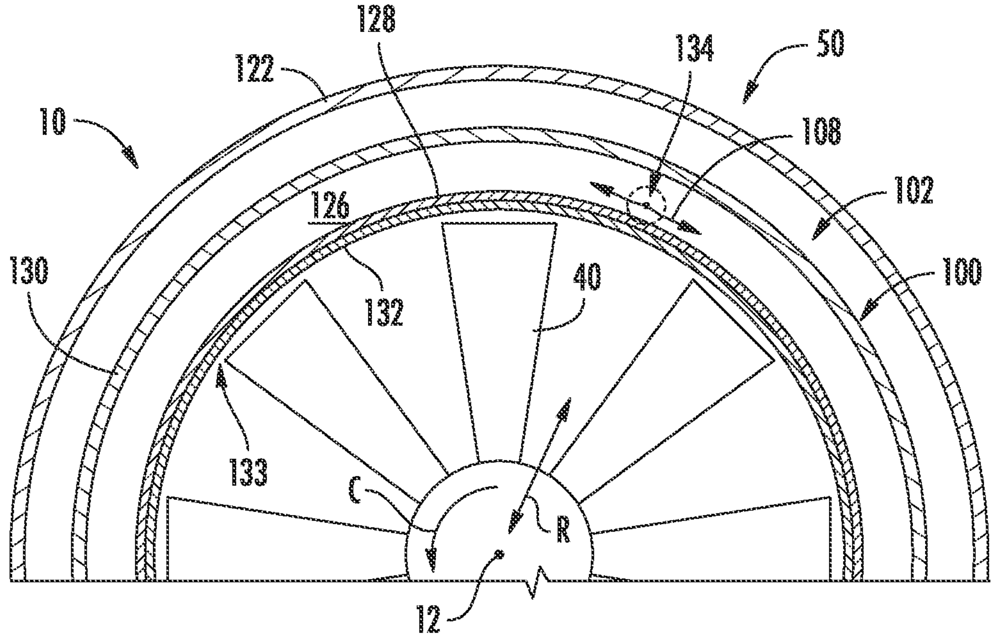
FIG. 4 is a close-up, schematic view of an outer nacelle and a fan of the exemplary gas turbine engine of FIG. 1, as viewed along an axial direction.

Referring now briefly to FIG. 4, a schematic view of the fan blades 40 and outer nacelle 50 is provided, as viewed along the axial direction A of the turbofan engine 10. As will be appreciated from FIG. 4, in at least certain exemplary embodiments, the control ring 102 is an annular control ring. In particular, for the embodiment depicted, the control ring 102 defines an inlet 134 for receiving the bleed airflow 108 from the airflow duct 106 of the activation assembly 104. Further, the cavity 126 is a substantially annular, 360 degree cavity (about the longitudinal centerline 12), such that the bleed airflow 108 from the inlet 134 may travel throughout the cavity 126 defined by the control ring 102 (i.e., along a circumferential direction C).

Alternatively, however, in other embodiments, the control ring 102 may include a plurality of airflow ducts 106 providing bleed airflow 108 to a plurality of individual cavities 126 spaced along the circumferential direction C of the turbofan engine 10.

Further, it will be appreciated that in still other exemplary embodiments, the clearance control system 100 may have still other suitable configurations. For example, referring now to FIG. 5, a clearance control system 100 in accordance with another exemplary embodiment of the present disclosure is provided. The view of FIG. 5 may be substantially the same view as the view of FIG. 3. Moreover, the clearance control system 100 and turbofan engine 10 depicted in FIG. 5 may be configured in substantially the same manner as exemplary clearance control system 100 and turbofan engine 10 described above with reference to FIG. 3. The same or similar numbers may refer to the same or similar parts.

Figure 5:
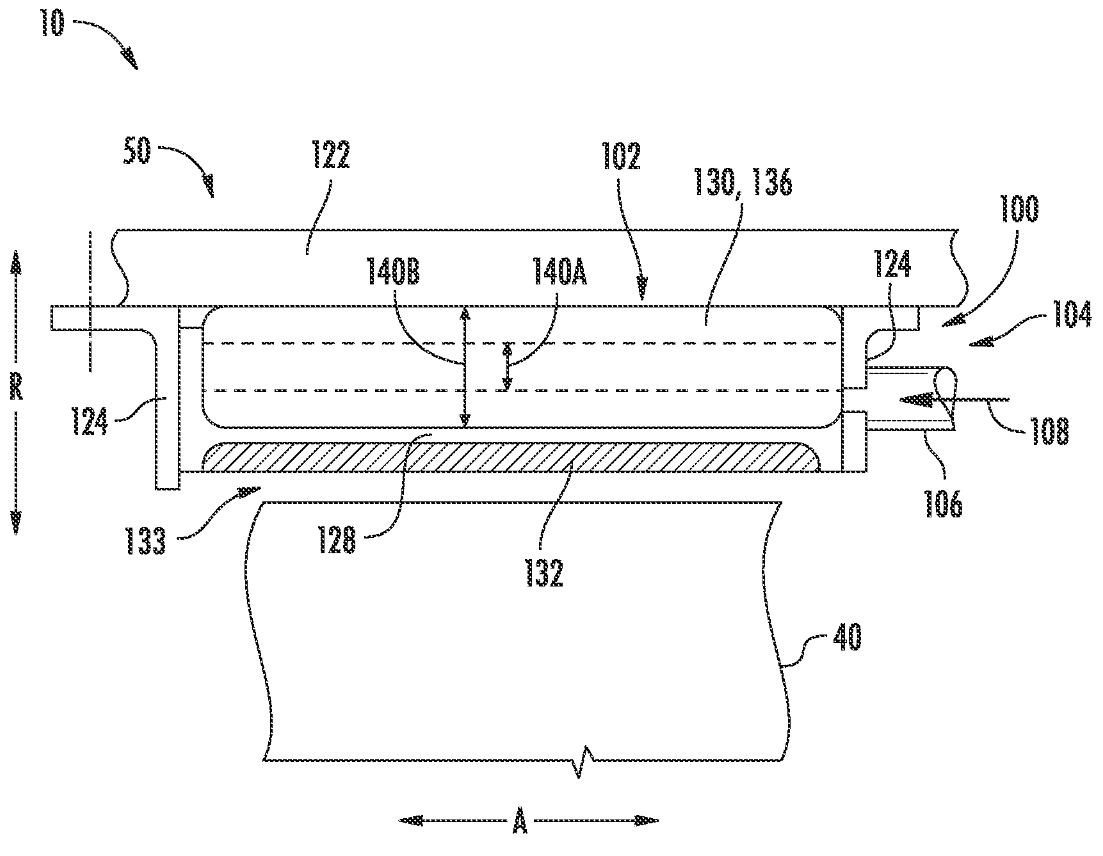
FIG. 5 is a close-up, cross-sectional view of an outer nacelle and a fan blade of a gas turbine engine in accordance with another exemplary embodiment of the present disclosure.

For example, the exemplary clearance control system 100 FIG. 5 includes a control ring 102 having an inner structure 128 and an outer structure 130. However, for the embodiment of FIG. 5, the control ring 102 is configured as an inflatable control ring. More specifically, for the exemplary embodiment depicted, the outer structure 130 is configured as a bladder 136, the bladder 136 is in fluid communication with the activation assembly 104, and more specifically in fluid communication with the airflow duct 106 of the activation assembly 104. For example, in certain exemplary embodiments, the bladder 136 of the inflatable control ring may be in fluid communication with the turbomachine 16, a bypass airflow passage 56 of the turbofan engine 10 (via, e.g., a pump), or both. Moreover, as with the embodiment of FIG. 3, the activation assembly 104 of the clearance control system 100 of FIG. 5 may include a valve 114 (not shown; see FIG. 2) for increasing and/or decreasing an airflow and airflow pressure provided to the bladder 136 of the inflatable control ring.

In such manner, it will be appreciated that the activation assembly 104 is operable with the inflatable control ring 102 to cause radial movement of the inner structure 128 to control a clearance gap 133 in response to a pressure of the airflow provided thereto from the activation assembly 104. More particularly, the bladder 136 is adapted to expand and contract to cause the radial movement of the inner structure 128.

In such manner, the control ring 102 may be configured to move between a relatively small radial depth 140A (depicted in phantom) in response to receiving relatively low pressure airflow, and a relatively large radial depth 140B in response to receiving relatively high pressure airflow. As the control ring 102 is moved from the relatively small radial depth 140A to the relatively large radial depth 140B, the control ring 102 may be configured to press against a structural component of the outer nacelle 50, such as the shell 122 within the outer nacelle 50, and push the inner structure 128 inwardly along the radial direction R relative to the shell 122 of the outer nacelle 50, effectively reducing an inner diameter of the outer nacelle 50 at the control ring 102 of the clearance control system 100.

Notably, for the embodiment depicted, the inner structure 128 further includes an abradable layer 132 attached thereto, similar to the embodiment of FIG. 3 discussed above.

Figure 6:
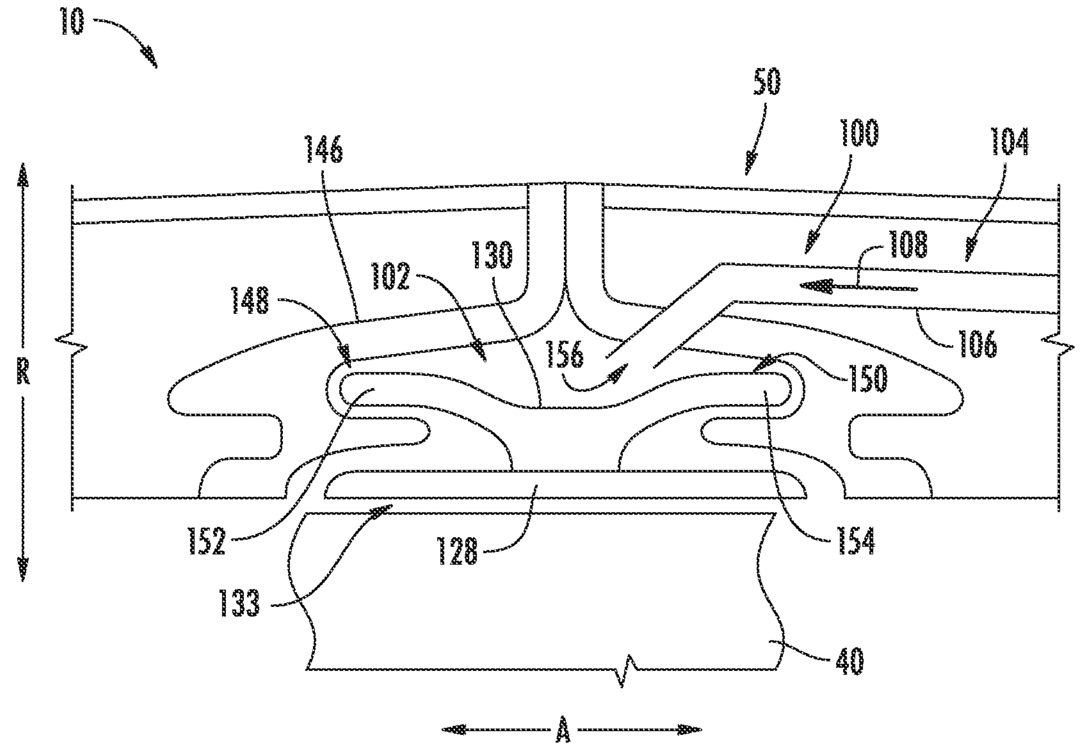
FIG. 6 is a close-up, cross-sectional view of an outer nacelle and a fan blade of a gas turbine engine in accordance with yet another exemplary embodiment of the present disclosure.

Referring now to FIG. 6, a clearance control system 100 in accordance with yet another example embodiment of the present disclosure is provided. The view of FIG. 6 may be substantially the same view as the view of FIG. 3. Moreover, the clearance control system 100 and turbofan engine 10 depicted in FIG. 6 may be configured in substantially the same manner as exemplary clearance control system 100 and turbofan engine 10 described above with reference to FIG. 3. The same or similar numbers may refer to the same or similar parts.

For example, the exemplary clearance control system 100 of FIG. 6 includes a control ring 102. However, for the embodiment of FIG. 6, the control ring 102 does not define an enclosed, internal cavity (e.g., cavity 126; see FIG. 3) for receiving an airflow from an activation assembly 104 of the clearance control system 100. For the embodiment of FIG. 6, the control ring 102 includes an inner structure 128 and an outer structure 130. Further, for the embodiment depicted, the outer nacelle 50 includes a mounting structure 146, with the outer structure 130 of the control ring 102 being coupled to the outer nacelle 50 through the mounting structure 146. In particular, the mounting structure 146 includes a forward axial cavity 148 and an aft axial cavity 150. Similarly, the outer structure 130 includes a forward flange 152 position within the forward axial cavity 148 and an aft flange 154 positioned within the aft axial cavity 150. The forward flange 152, forward axial cavity 148, aft flange 154, and aft axial cavity 150 each extends generally along an axial direction A of the turbofan engine 10. Notably, for the embodiment depicted, a height of the forward axial cavity 148 along a radial direction R of the turbofan engine 10 is greater than a thickness of the forward flange 152 along the radial direction R, and similarly, a height of the aft axial cavity 150 along the radial direction R of the turbofan engine 10 is greater than a thickness of the aft flange 154 along the radial direction R. In such a manner, the control ring 102 may expand and contract relative to the mounting structure 146 during operation of the turbofan engine 10 and clearance control system 100.

Notably, as with the embodiments described above, the control ring 102 is in thermal communication with the airflow from the activation assembly 104. More specifically, for the embodiment depicted, the activation assembly 104 includes an airflow duct 106 defining an outlet 156. The airflow duct 106 extends through the mounting structure 146 of the outer nacelle 50 and is configured to provide an airflow (e.g., a bleed airflow 108 in the embodiment depicted) through the airflow duct 106 through the outlet 156 and onto the outer structure 130 of the control ring 102. In such a manner, a temperature of the airflow may affect a thermal expansion and/or contraction of the control ring 102. In particular, in at least certain exemplary aspects, one or more components of the control ring 102 may be annular (see, e.g., FIG. 4), such that a thermal growth of such components results in an increase in an inner diameter of the control ring 102, and a thermal contraction of such components results in a reduction of the inner diameter of the control ring 102. This thermal expansion and contraction may be used to control the clearance gap 133 in response to a corresponding thermal expansion or contraction of the fan blades 40.

In still other exemplary embodiments, other suitable means or mechanisms may be provided for changing an inner diameter of the control ring 102 during operation of the clearance control system 100 (i.e., a distance from a longitudinal axis of the gas turbine engine to the control ring 102 along the radial direction R). For example, referring now to FIG. 7, a clearance control system 100 in accordance with still another exemplary embodiment of the present disclosure is provided. For the embodiment of FIG. 7, the clearance control system 100 again includes a control ring 102 and an activation assembly 104. For the embodiment depicted, the control ring 102 includes an inner structure 128 and an outer structure 130. However, for the embodiment depicted, the outer structure 130 includes a plurality of shape memory alloy components 158 extending between the inner structure 128 and a structural component of the outer nacelle 50. In particular, the structural component of the outer nacelle 50 may be a case or a shell 122 of the outer nacelle 50.

In the embodiment depicted, the plurality of shape memory alloy components 158 are formed of a shape memory alloy material. As used herein, the term "shape memory alloy material" refers to a material that can be deformed when below a transformation temperature, but returns to its pre-deformed ("remembered") shape when heated above the transformation temperature.

Moreover, the plurality of shape memory alloy components 158 are in thermal communication with an airflow through the activation assembly 104, and more specifically, are in airflow communication with a bleed airflow 108 through an airflow duct 106 of the activation assembly 104. In such a manner, a temperature of the bleed airflow 108 may cause the plurality of shape memory alloy components 158 to move between an extended position (depicted in phantom) and a retracted position to change the inner diameter of the control ring 102 during operation of the clearance control system 100, and more specifically to cause the radial movement of the inner structure 128 to control the clearance gap 133.

Moreover, it will be appreciated that although for the embodiment of FIGS. 3 and 4 the control ring 102 of the clearance control system 100 is configured as an annular control ring, in other embodiments the control ring 102 may instead be configured as a segmented control ring 102, such as a segmented shroud. For example, in the exemplary embodiments of the control ring 102 of FIGS. 6 and 7, the control ring 102 may be configured as a segmented shroud.

Figure 8:
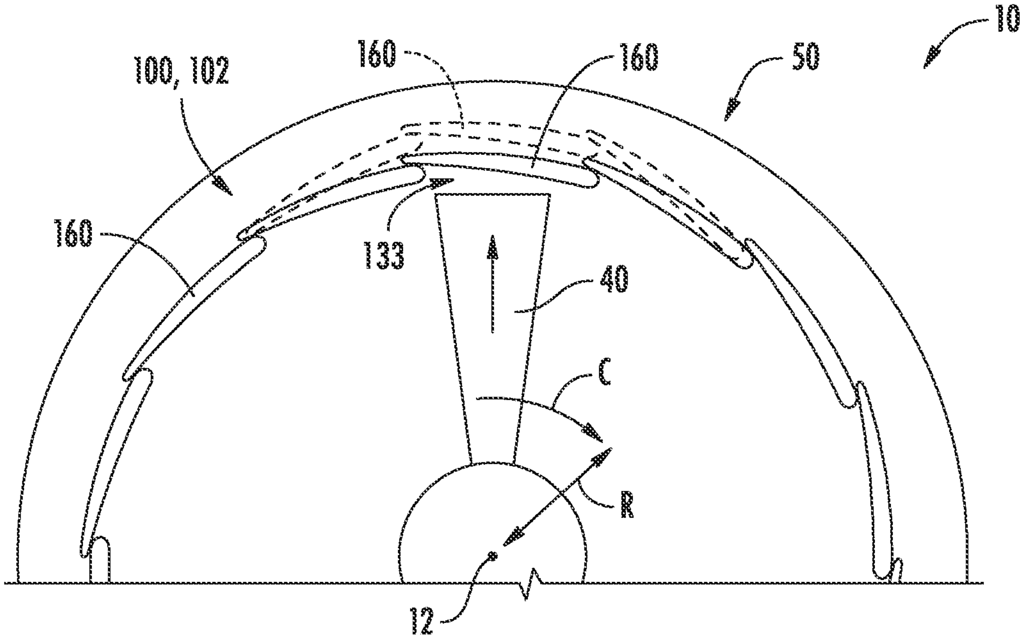
FIG. 8 is a close-up, schematic view of an outer nacelle and a fan of a gas turbine engine in accordance with another exemplary embodiment of the present disclosure, as viewed along an axial direction.

More specifically, referring now to FIG. 8, a cross-sectional view of a clearance control system 100 having a control ring 102 configured as a segmented shroud is provided. For the embodiment depicted, the segmented shroud assembly includes a plurality of shroud segments 160 arranged along a circumferential direction C of the turbofan engine 10, and more specifically, arranged in an overlapping manner along the circumferential direction C. In such a manner, the plurality of shroud segments 160 may be slidable relative to one another.

With such a configuration, the shroud assembly may define an inner radius along the radial direction R of the turbofan engine 10 that is expandable along the radial direction R. For example, in response to contact from a fan blade 40 of the plurality of fan blades 40 (only one depicted in FIG. 8 for clarity), one or more of the plurality of shroud segments 160 may be configured to move outward along the radial direction R such that the shroud assembly defines a larger inner radius at such location in response to such contact from the fan blades 40. In such a manner, the plurality of shroud segments 160 may accommodate one or more maneuvers or other non-steady-state operating conditions wherein the fan and fan blades 40 move relative to the outer nacelle 50.

Figure 7:
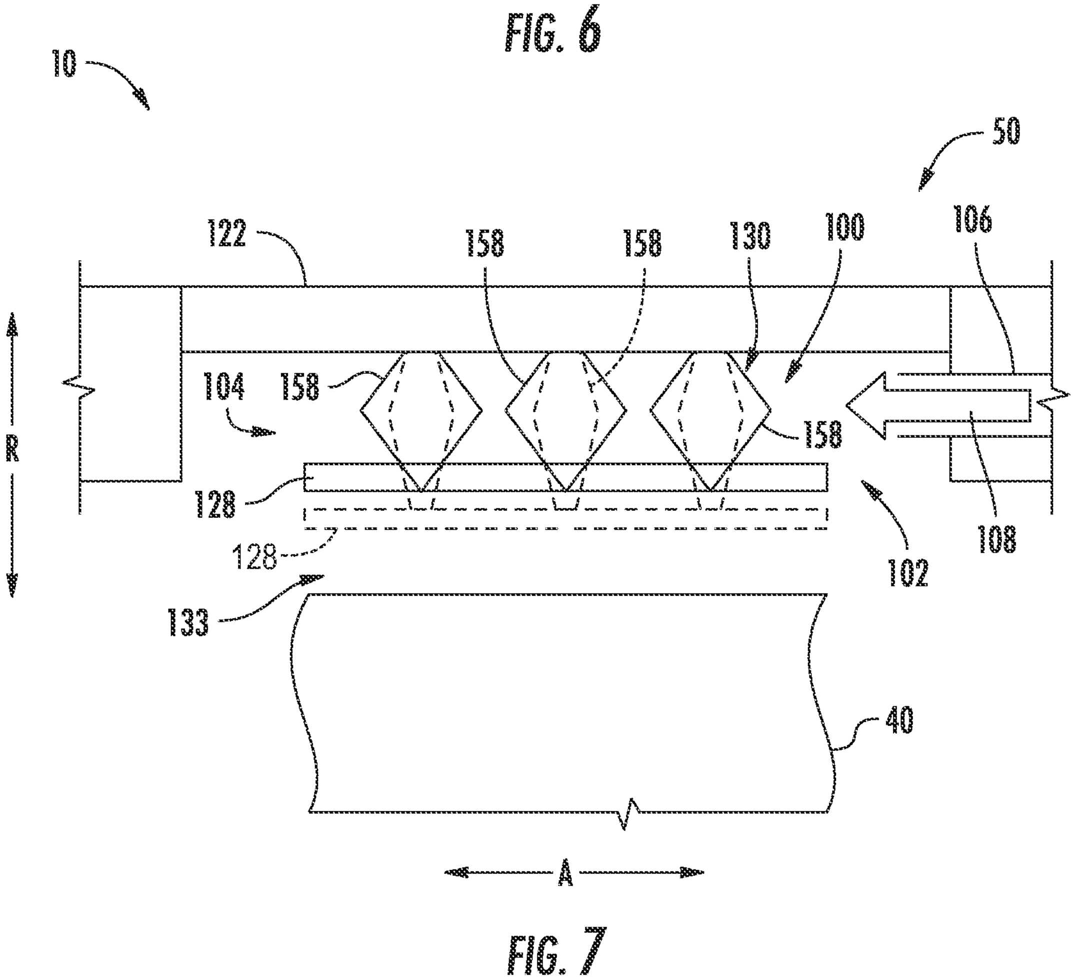
FIG. 7 is a close-up, cross-sectional view of an outer nacelle and a fan blade of a gas turbine engine in accordance with still another exemplary embodiment of the present disclosure.

It at least certain exemplary embodiments, the control ring 102 of FIG. 8 may be configured in a similar manner as the exemplary control rings 102 of FIG. 5, 6 or 7. In such a manner, the control ring 102 may include an inner structure (similar to inner structures 128 of FIGS. 5, 6, and 7), with the inner structure formed of the plurality of shroud segments 160 instead of an annular structure. In such a manner, the plurality of shroud segments 160 may be operable with an actuation assembly 104 (not shown) and an outer structure 130 (not shown) to control a clearance gap 133.

For example, referring briefly back to FIG. 6, the exemplary control ring 102 of FIG. 6 may be configured in a similar manner as the segmented shroud assembly of FIG. 8. For example, with such a configuration, the inner structure 128 of the control ring 102 depicted in FIG. 6 may be a shroud segment 160 of the plurality of shroud segments 160 described with reference to FIG. 8. In such a manner, the positioning of the outer structure 130 within the mounting structure 146 may allow for the shroud segment 160 (labeled as simply the control ring 102 in FIG. 6) to move outward along the radial direction R, and further to slide along the circumferential direction C (see FIG. 8) relative to an adjacent shroud segment 160 to allow the shroud assembly/control ring 102 to define the variable radius at a local region.

Exemplary clearance control systems of the present disclosure may therefore allow for a gas turbine engine to maintain a desired clearance between fan blades of a fan of the gas turbine engine and an outer nacelle of the gas turbine engine to maintain an efficiency of the fan of the gas turbine engine, despite a difference in coefficients of thermal expansion between a material forming the fan blades and a material forming the outer nacelle.

Further aspects are provided by the subject matter of the following clauses:

A gas turbine engine defining a radial direction, the gas turbine engine comprising: a turbomachine; a fan comprising a plurality of fan blades rotatably driven by the turbomachine; a nacelle surrounding at least in part the plurality of fan blades of the fan, the nacelle comprising an outer shell; and a clearance control system comprising: a control ring having an outer structure positioned inward of the outer shell of the nacelle along the radial direction and an inner structure facing the plurality of fan blades, the control ring defining a clearance gap with the plurality of fan blades, the inner structure capable of radial movement relative to the nacelle; and an activation assembly operable with the control ring to cause the radial movement of the inner structure to control the clearance gap.

A gas turbine engine comprising: a turbomachine; a fan comprising a plurality of fan blades rotatably driven by the turbomachine; a nacelle surrounding at least in part the plurality of fan blades of the fan; and a clearance control system comprising a control ring positioned at least partially within the nacelle, coupled to the nacelle, or both for control of a clearance between the plurality of fan blades and the nacelle.

The gas turbine engine of one or more of the preceding clauses, wherein the activation assembly comprises an airflow duct operable to feed air from the turbomachine to the control ring to cause the radial movement of the inner structure to control the clearance gap.

The gas turbine engine of one or more of the preceding clauses, wherein the inner and outer structures define one or more airflow gaps therebetween, and wherein the airflow duct is in fluid communication with the one or more airflow gaps.

The gas turbine engine of one or more of the preceding clauses, wherein the outer structure is a bladder in fluid communication with the airflow duct whereby the bladder is adapted to expand and contract to cause the radial movement of the inner structure.

The gas turbine engine of one or more of the preceding clauses, wherein the outer structure comprises a plurality of shape memory alloy components connected to the inner structure and in fluid communication with the airflow duct and adapted to change shape radially to cause the radial movement of the inner structure.

The gas turbine engine of one or more of the preceding clauses, wherein the inner structure is segmented in an overlapping arrangement, with individual segments capable of both radial and circumferential movement.

The gas turbine engine of one or more of the preceding clauses, wherein the clearance control system further includes an abradable layer coupled to the inner structure of the control ring and positioned between the inner structure of the control ring and the plurality of fan blades.

The gas turbine engine of one or more of the preceding clauses, wherein the clearance control system is in fluid flow communication with the turbomachine for receiving a bleed airflow from the turbomachine.

The gas turbine engine of one or more of the preceding clauses, wherein the control ring is in thermal communication with the bleed airflow.

The gas turbine engine of one or more of the preceding clauses, wherein the control ring is an annular control ring formed of a metal material, and wherein the nacelle is formed of a composite material.

The gas turbine engine of one or more of the preceding clauses, wherein the plurality of fan blades are also formed of the metal material.

The gas turbine engine of one or more of the preceding clauses, wherein the control ring comprises two layers.

The gas turbine engine of one or more of the preceding clauses, wherein the clearance control system further includes an abradable layer coupled to the control ring and positioned between the control ring and the plurality of fan blades.

The gas turbine engine of one or more of the preceding clauses, wherein the control ring is an inflatable control ring.

The gas turbine engine of one or more of the preceding clauses, wherein the clearance control system is in fluid flow communication with the turbomachine for receiving a bleed airflow from the turbomachine, and wherein the inflatable control ring is in fluid communication with the bleed airflow.

The gas turbine engine of one or more of the preceding clauses, wherein the control ring comprises a segmented shroud assembly.

The gas turbine engine of one or more of the preceding clauses, wherein the segmented shroud assembly is coupled to a structural member of the nacelle through a plurality of shape memory alloy components formed of a shape memory alloy material.

The gas turbine engine of one or more of the preceding clauses, wherein the clearance control system is in fluid flow communication with the turbomachine for receiving a bleed airflow from the turbomachine, and wherein the plurality of shape memory alloy components are each in thermal communication with the bleed airflow.

The gas turbine engine of one or more of the preceding clauses, wherein the segmented shroud assembly comprises a plurality of shroud segments arranged in an overlapping manner and slidable relative to one another.

The gas turbine engine of one or more of the preceding clauses, wherein the segmented shroud assembly defines an inner radius that is expandable along a radial direction of the gas turbine engine in response to contact from the fan blades.

The gas turbine engine of one or more of the preceding clauses, wherein the inner structure of the control ring comprises a segmented shroud assembly.

The gas turbine engine of one or more of the preceding clauses, wherein the outer structure is configured as a plurality of shape memory alloy components formed of a shape memory alloy material, and wherein the segmented shroud assembly is coupled to a structural member of the nacelle through the plurality of shape memory alloy components.

The gas turbine engine of one or more of the preceding clauses, wherein the activation assembly is in fluid flow communication with the turbomachine for receiving a bleed airflow from the turbomachine, and wherein the plurality of shape memory alloy components are each in thermal communication with the bleed airflow.

The gas turbine engine of one or more of the preceding clauses, wherein the segmented shroud assembly comprises a plurality of shroud segments arranged in an overlapping manner and slidable relative to one another.

The gas turbine engine of one or more of the preceding clauses, wherein the segmented shroud assembly defines an inner radius that is expandable along a radial direction of the gas turbine engine in response to contact by the fan blades.

A clearance control system for a gas turbine engine having a turbomachine, a fan comprising a plurality of fan blades, and a nacelle surrounding at least in part the plurality of fan blades, the nacelle having an outer shell, the clearance control system comprising: a control ring having an outer structure for positioning radially inward of the outer shell of the nacelle and an inner structure adapted to face the plurality of fan blades, the control ring defining a clearance gap with the plurality of fan blades when the clearance control system is installed in the gas turbine engine, the inner structure capable of radial movement relative to the nacelle; and an activation assembly comprising an airflow duct operable, when the clearance control system is installed in the gas turbine engine, to feed air from the turbomachine to the control ring to cause the radial movement of the inner structure to control the clearance gap.

A clearance control system for a gas turbine engine having a turbomachine, a fan comprising a plurality of fan blades, and a nacelle surrounding at least in part the plurality of fan blades, the clearance control system comprising: a control ring configured to be positioned at least partially within the nacelle of the gas turbine engine, coupled to the nacelle of the gas turbine engine, or both; and an activation assembly operable with the control ring, the activation assembly configured to be in communication with the turbomachine of the gas turbine engine, a bypass passage of the gas turbine engine, or both when the clearance control system is installed in the gas turbine engine to control a clearance between the plurality of fan blades and the nacelle.

The clearance control system of one or more of the preceding clauses, wherein the inner and outer structures define one or more airflow gaps therebetween, and wherein the airflow duct is in fluid communication with the one or more airflow gaps.

The clearance control system of one or more of the preceding clauses, wherein the outer structure is a bladder in fluid communication with the airflow duct whereby the bladder is adapted to expand and contract to cause the radial movement of the inner structure.

The clearance control system of one or more of the preceding clauses, wherein the outer structure comprises a plurality of shape memory alloy components connected to the inner structure and in fluid communication with the airflow duct and adapted to change shape radially to cause the radial movement of the inner structure.

The clearance control system of one or more of the preceding clauses, wherein the inner structure is segmented in an overlapping arrangement, with individual segments capable of both radial and circumferential movement.

The clearance control system of one or more of the preceding clauses, wherein the activation assembly is configured to be in fluid communication with the turbomachine of the gas turbine engine for receiving a bleed airflow from the turbomachine.

The clearance control system of one or more of the preceding clauses, wherein the control ring is in thermal communication with the bleed airflow.

The clearance control system of one or more of the preceding clauses, wherein the control ring is an annular control ring formed of a metal material, and wherein the nacelle is formed of a composite material.

The clearance control system of one or more of the preceding clauses, wherein the clearance control system further includes an abradable layer coupled to the control ring and positioned between the control ring and the plurality of fan blades.

The clearance control system of one or more of the preceding clauses, wherein the control ring is an inflatable control ring.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining a radial direction, the gas turbine engine comprising:

a turbomachine;

a fan comprising a plurality of fan blades rotatably driven by the turbomachine;

a nacelle surrounding at least in part the plurality of fan blades of the fan, the nacelle comprising an outer shell; and a clearance control system comprising:

a control ring having an outer structure positioned inward of the outer shell of the nacelle along the radial direction and an inner structure facing the plurality of fan blades, the control ring defining a clearance gap with the plurality of fan blades, the inner structure capable of radial movement relative to the nacelle; and an activation assembly operable with the control ring to cause the radial movement of the inner structure to control the clearance gap.

2. The gas turbine engine of claim 1, wherein the activation assembly comprises an airflow duct operable to feed air from the turbomachine to the control ring to cause the radial movement of the inner structure to control the clearance gap.

3. The gas turbine engine of claim 2, wherein the inner and outer structures define one or more airflow gaps therebetween, and wherein the airflow duct is in fluid communication with the one or more airflow gaps.

4. The gas turbine engine of claim 2, wherein the outer structure is a bladder in fluid communication with the airflow duct whereby the bladder is adapted to expand and contract to cause the radial movement of the inner structure.

5. The gas turbine engine of claim 2, wherein the outer structure comprises a plurality of shape memory alloy components connected to the inner structure and in fluid communication with the airflow duct and adapted to change shape radially to cause the radial movement of the inner structure.

6. The gas turbine engine of claim 1, wherein the inner structure is segmented in an overlapping arrangement, with individual segments capable of both radial and circumferential movement.

7. The gas turbine engine of claim 1, wherein the control ring is an annular control ring formed of a metal material, and wherein the nacelle is formed of a composite material.

8. The gas turbine engine of claim 7, wherein the plurality of fan blades are also formed of the metal material.

9. The gas turbine engine of claim 1, wherein the clearance control system further includes an abradable layer coupled to the inner structure of the control ring and positioned between the inner structure of the control ring and the plurality of fan blades.

10. The gas turbine engine of claim 1, wherein the inner structure of the control ring comprises a segmented shroud assembly.

11. The gas turbine engine of claim 10, wherein the outer structure is configured as a plurality of shape memory alloy components formed of a shape memory alloy material, and wherein the segmented shroud assembly is coupled to a structural member of the nacelle through the plurality of shape memory alloy components.

12. The gas turbine engine of claim 11, wherein the activation assembly is in fluid flow communication with the turbomachine for receiving a bleed airflow from the turbomachine, and wherein the plurality of shape memory alloy components are each in thermal communication with the bleed airflow.

13. The gas turbine engine of claim 10, wherein the segmented shroud assembly comprises a plurality of shroud segments arranged in an overlapping manner and slidable relative to one another.

14. The gas turbine engine of claim 13, wherein the segmented shroud assembly defines an inner radius that is expandable along a radial direction of the gas turbine engine in response to contact by the fan blades.

15. A clearance control system for a gas turbine engine having a turbomachine, a fan comprising a plurality of fan blades, and a nacelle surrounding at least in part the plurality of fan blades, the nacelle having an outer shell, the clearance control system comprising:

a control ring having an outer structure for positioning radially inward of the outer shell of the nacelle and an inner structure adapted to face the plurality of fan blades, the control ring defining a clearance gap with the plurality of fan blades when the clearance control system is installed in the gas turbine engine, the inner structure capable of radial movement relative to the nacelle; and an activation assembly comprising an airflow duct operable, when the clearance control system is installed in the gas turbine engine, to feed air from the turbomachine to the control ring to cause the radial movement of the inner structure to control the clearance gap.

16. The clearance control system of claim 15, wherein the inner and outer structures define one or more airflow gaps therebetween, and wherein the airflow duct is in fluid communication with the one or more airflow gaps.

17. The clearance control system of claim 15, wherein the outer structure is a bladder in fluid communication with the airflow duct whereby the bladder is adapted to expand and contract to cause the radial movement of the inner structure.

18. The clearance control system of claim 15, wherein the outer structure comprises a plurality of shape memory alloy components connected to the inner structure and in fluid communication with the airflow duct and adapted to change shape radially to cause the radial movement of the inner structure.

19. The clearance control system of claim 15, wherein the inner structure is segmented in an overlapping arrangement, with individual segments capable of both radial and circumferential movement.

20. The clearance control system of claim 15, wherein the control ring is an annular control ring formed of a metal material.

* * * * *